March 17, 1953  G. M. EVANS  2,632,067
AUTOMOBILE SAFETY IGNITION LOCK
Filed Aug. 2, 1950
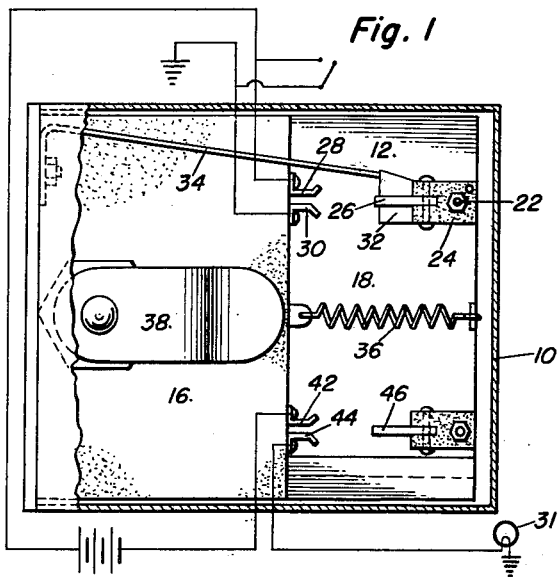
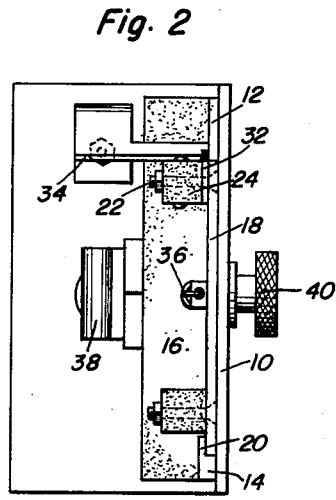
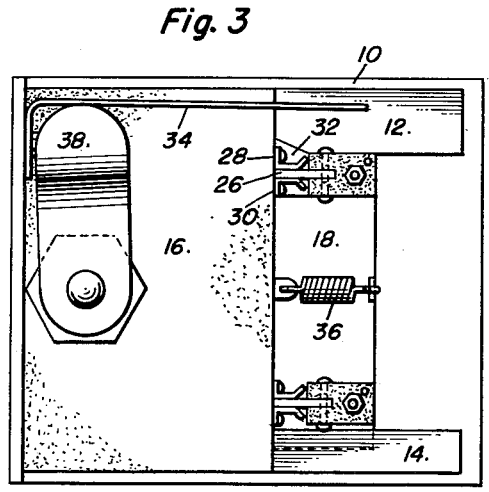
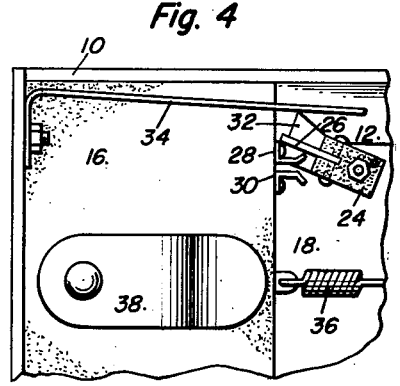
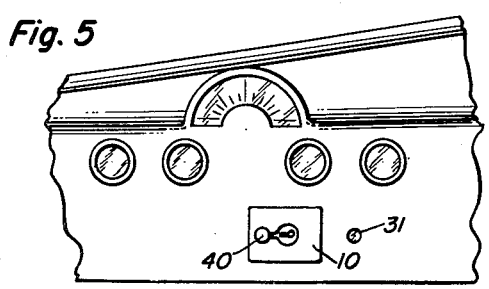
George M. Evans
INVENTOR.

Patented Mar. 17, 1953

2,632,067

UNITED STATES PATENT OFFICE 2,632,067

AUTOMOBILE SAFETY IGNITION LOCK

George M. Evans, Tucson, Ariz.

Application August 2, 1950, Serial No. 177,284

3 Claims. (Cl. 200—42)

This invention relates to the class of switches and more particularly to a switch for use in an automotive ignition system whereby such will prevent the unauthorized use of the vehicle.

An object of this invention is to provide a control ignition switch which has means operatively associated therewith for preventing an operative circuit between the battery and the starting motor of the engine from being made unless the switch is actuated using the proper key to the lock.

A further object of this invention is to provide an automobile safety ignition lock having a contact circuit completing member which is pivotally attached to a slide so that upon forcing of the lock the circuit making member will be pivoted out of its current completing position.

Still further objects of the invention reside in the provision of an improved automobile safety ignition lock that is strong, durable, highly efficient in operation, simple in construction and manufacture, capable of being readily installed on any automotive vehicle on which such is desired to be used, and which device is relatively inexpensive to manufacture.

These, together with the various ancillary objects of the invention which will later become apparent as the following description proceeds, are attained by this automobile safety ignition lock, the preferred embodiment of which has been illustrated by way of example only, in the accompanying drawings, wherein:

Figure 1 is a side elevational view of the device comprising the present invention with some of the casing being broken away to show other parts in greater detail;

Figure 2 is an end elevational view of the approved safety ignition lock comprising the present invention;

Figure 3 is a view similar to the view shown in Figure 1 with various elements of the invention being shown in a circuit closed position;

Figure 4 is a partial elevational view showing the parts in the same position as in Figure 3 after the lock has been forced and the contact making element pivoted from circuit closing position; and Figure 5 is an elevational view showing the invention installed on a dashboard of an automobile.

With continuing reference to the accompanying drawings wherein like reference numerals designate similar parts throughout the various views, reference numeral 10 generally designates a housing on which there is mounted trackways 12 and 14 on which trackways there is permanently attached and spaced from the casing 10 an insulative member 16 formed from Bakelite or other similar substance.

A slide 18 is slidably mounted in the guideway formed by the spaced trackways 12 and 14. As can be readily seen the trackway 14 is provided with an offset portion 20 for retaining the slide 18 against lateral motion.

Mounted on the slide 18 by means of a pin or screw 22 is an insulative element 24. Because of the mounting by means of the pin 22 the element 24 is capable of pivoting thereabout. Extending from the insulative element 24 is a contact making member 26. The pin 22 and element 24 comprise a pivotal mounting for the contact making member 26 swingable in opposite directions to swing said contact making member 26 into and out of alignment with the pair of contact members 28, 30. The slide 18 is adapted to be advanced and retracted relative to said pair of contact members 28, 30 to advance and retract the contact making member 26 into and from bridging relation to said pair of contact members 28, 30, and, as will be seen, said contact making member 26 will bridge said pair of members 28, 30 when aligned therewith solely. The contact making member 26 is adapted to complete an electrically operative circuit between the pair of spaced contact members 28 and 30 mounted on the insulative member 16. In use the contact member 28 may be operatively connected to a suitable source of power which is grounded and the contact 30 may be connected through the ground so that when the circuit making member 26 engages the contact members 28 and 30 the circuit is closed. A stop member 32 is carried by the insulative element 24 and is normally engaged when the slide 18 is retracted by a resilient or spring-like member 34 secured to the casing 10 in the path of advance of the insulated member 24.

Terminally secured to the plate 16 and to the slide 18 is a coil spring 36 for urging the slide 18 to advance relative to the plate 16 and the pair of contact members 28, 30 so as to permit the circuit making member 26 to engage and bridge the contact members 28 and 30. However, the resilient flexible member 34 engages the stop member 32 and tends to prevent such advance of the slide 18, and if force is applied to said slide 18 to advance the same, said member 34 will cause the stop member 32 and insulative element 24 to swing in a direction to swing the contact making member 26 out of alignment with the pair of contact members 28, 30 and hence out of bridging relation to said members 28, 30.

There is provided a cam 38 which is actuated by a key engaging the terminals of a lock and permitting rotation of the lock drum and the cam which is affixed thereto. The cam is adapted to engage the resilient member when rotated to the position as shown in Figure 3 and flex the resilient member 34 from engagement with the stop member 32 thereby permitting the spring 36 to urge the slide 18 to advance relatively to the insulative plate 16 and contact members 28, 30 thus permitting the circuit making member 26 to engage and bridge the contacts 28 and 30. Accordingly, when the unauthorized user attempts to force the lock by means of pushing the projecting recess member 40 which is secured to the slide 18 and which extends through the casing 10 the member 34 will swing the stop member 32 together with the insulative element 24 and the attached contact making member 26 so that it will not complete the circuit between the contacts 28 and 30 and will assume the position as is shown in Figure 4. A lamp 31 is provided so as to light when the contacts are closed.

As shown in the drawings there are provided other pairs of spaced contacts such as 42 and 44 which are secured to the insulative plate 16. Likewise other circuit completing members 46 may be secured to the slide 18. The contacts 42 and 44 may be secured to the source of power and to the other auxiliaries of the automotive vehicle in order that such may be used even though the lock has been forced.

Since from the foregoing the construction and advantages of this automobile safety ignition lock are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. An ignition switch comprising a housing, a pair of fixed side by side contacts in said housing, a slide mounted in said housing for advance and retraction relative to said pair of contacts, a bridging contact for the pair of contacts, a pivotal mounting on said slide for said bridging contact adapted to be advanced and retracted by said slide to advance and retract the bridging contact into and from bridging relation to said pair of contacts, said mounting being swingable in opposite directions to swing said bridging contact into and out of alignment with said pair of contacts for bridging said pair of contacts when aligned with said pair solely, spring means for advancing said slide to advance the mounting to advance said bridging contact into bridging relation, means operative upon advance of the mounting by said slide to swing the mounting in the direction to swing said bridging contact out of alignment with said pair of contacts comprising a stop on said mounting, and a flexible member mounted in said housing in the path of advance of said mounting and normally engaging the stop, said member being flexible out of said path to disengage said top and permit said bridging contact to be aligned with said pair of contacts during advance of said slide, mounting and bridging contact, and key operated rotary means for flexing said member out of said path.

2. An ignition switch according to claim 1, said flexible member comprising a leaf spring secured at one end in the housing with its other end normally engaging the stop when the mounting is retracted by said slide.

3. An ignition switch according to claim 1, said key operated rotary means including a rotary cam in said housing rotatable into and from engagement with said flexible member.

GEORGE M. EVANS.

REFERENCES CITED

The following references are of record in the file of this patent:

UNITED STATES PATENTS

| Number | Name | Date |
| --- | --- | --- |
| 348,456 | Fairchild et al. | Aug. 31, 1886 |
| 986,962 | Blank | Mar. 14, 1911 |
| 1,187,338 | Kreiner | June 13, 1916 |
| 1,753,873 | Sullivan | Apr. 8, 1930 |